Dec. 27, 1966 LA VAR E. WHITTLE 3,294,980
HIGH SPEED BINARY
Filed Feb. 27, 1963
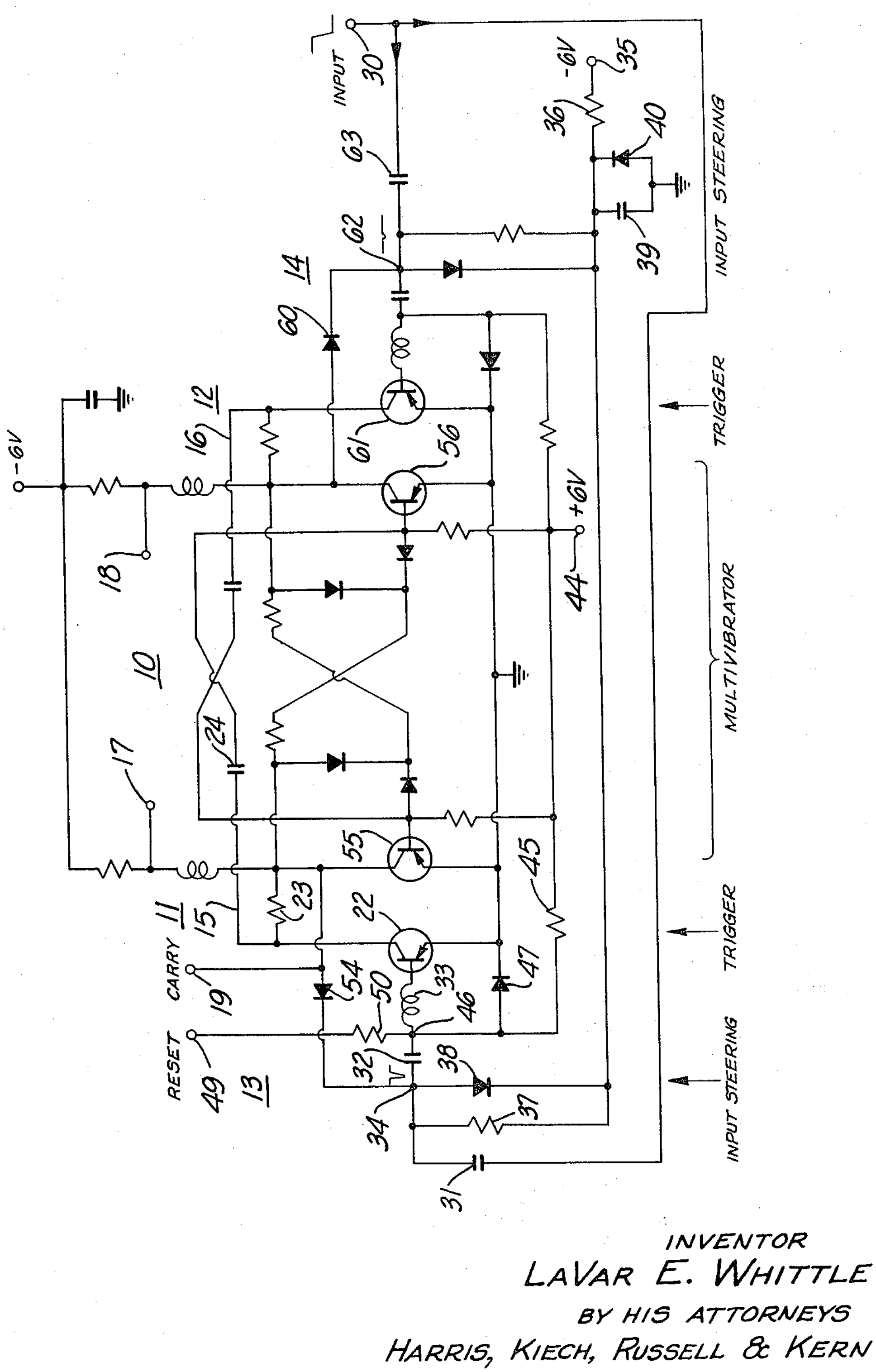
INVENTOR
LAVAR E. WHITTLE
BY HIS ATTORNEYS
HARRIS, KIECH, RUSSELL & KERN United States Patent Office 3,294,980
Patented Dec. 27, 1966

3,294,980

HIGH SPEED BINARY

LaVar E. Whittle, Granada Hills, Calif., assignor to Pacific Industries, Inc., San Fernando, Calif., a corporation of California Filed Feb. 27, 1963, Ser. No. 261,355
5 Claims. (Cl. 307—88.5)

This invention relates to binary circuits and, in particular, to binary circuits operable from zero to 100 million pulses per second and higher.

A binary circuit basically consists of a bistable multivibrator circuit with a common input connection. Input steering circuits are normally utilized to direct the incoming signal to a selected side of the multivibrator circuit and block the signal from the other side so as to improve the operating characteristic of the multivibrator.

Binary circuits often incorporate trigger circuits between the input steering circuit and the multivibrator circuit with the trigger circuits providing appropriate waveform control to raise the maximum operating speed of the multivibrator circuits.

It is an object of the invention to provide a new and improved input steering circuit suitable for use with conventional trigger circuits and bistable multivibrator circuits to provide a binary circuit that is operable at higher frequencies than previously possible.

It is an object of the invention to provide an input steering circuit which permits reduction in the signal losses in the steering circuit. A particular object is to provide such a circuit incorporating parallel impedance discrimination and one which does not require signal transmission through diodes.

It is an object of the invention to provide an input steering circuit which operates on a voltage change or signal edge rather than on a pulse so as not to be dependent upon or affected by input pulse duration.

It is a particular object of the invention to provide a binary circuit having a bistable multivibrator circuit, a trigger circuit for coupling input pulses to the multivibrator circuit, and an input steering circuit including first and second pulse forming circuits for converting input voltage changes to pulses, first means for coupling the output of the first pulse forming circuit to the trigger circuit for one side of the multivibrator circuit, second means for coupling the output of the second pulse forming circuit to the trigger circuit for the other side of the multivibrator circuit, a first diode connected in parallel with the first coupling means and associated trigger circuit, and a second diode connected in parallel with the second coupling means and associated trigger circuit. A further object is to provide such a circuit in which one of the diodes presents a low impedance path to an input pulse and the other of the diodes presents a high impedance path to an input pulse, with the arrangement of the high and low impedance paths switching as the multivibrator circuit switches from one state to the other.

It is a further object of the invention to provide a new and improved input steering circuit particularly adapted for use with a transistor multivibrator circuit and a transistor trigger circuit and including an input terminal, a first path from the input terminal to the base of the first trigger circuit transistor and including serially connected capacitors joined at a first junction point, a second path from the input terminal to the base of the second trigger circuit transistor and including serially connected capacitors joined at a second junction point, means for producing a bias at the first transistor base of a polarity to bias such transistor off, means for producing a bias at the second transistor base of a polarity to bias such transistor off, means for producing a bias at the first junction point of a polarity opposite to the associated base bias, means for producing a bias at the second junction point of a polarity opposite to the associated base bias, first and second diodes, means for connecting the first diode between the first junction point and the collector of one multivibrator circuit transistor, and means for connecting the second diode between the second junction point and the collector of the other multivibrator circuit transistor, whereby nonconductance of a multivibrator transistor produces a back bias on the associated diode to provide the high impedance parallel path.

The invention also comprises novel combinations and arrangements of circuit components which will more fully appear in the course of the following description. The drawing merely shows and the description merely describes a preferred binary circuit embodying the invention and which is given by way of illustration or example.

The binary shown in the drawing includes a multivibrator 10, a trigger circuit 11, 12 for driving the multivibrator, and an input steering circuit 13, 14 for directing the input signals to the appropriate halves of the trigger circuit for causing the multivibrator to change state. The multivibrator 10 may be a conventional transistor multivibrator circuit having inputs at lines 15, 16 and providing outputs at terminals 17, 18. In a typical application, a plurality of the binaries are connected in a chain to form a counter and a carry signal for the next binary in the chain may be provided at a separate terminal 19.

The trigger circuit may be a conventional transistor trigger circuit having two identical halves for driving the two sides of the multivibrator respectively. In the trigger circuit 11, a trigger transistor 22 has its emitter connected o circuit ground and its collector connected to one multivibrator transistor collector through a resistor 23, with the trigger transistor collector also connected to the base of the other multivibrator transistor through the input line 15 and capacitor 24. The input signal is connected to the base of the trigger transistor 22 viaw the input steering circuit 13. Portion 12 of the trigger circuit is identical to portion 11.

The input steering circuit 13 includes an input terminal 30 and capacitors 31, 32 and inductor 33 connected in series between the input terminal and the base of the trigger transistor 22. A negative bias voltage is provided at the junction point 34 of the capacitors 31, 32 from a source terminal 35 through a resistor 36 and a resistor 37-diode 38 parallel combination. Either resistor 37 or diode 38 may be used alone but both are preferred for handling inputs with various rates of voltage change. The diode 38 permits rapid recovery of the normal voltage at junction 34 after an input to improve the operation at high input rates. A capacitor 39 and another diode 40 may be connected in parallel to circuit ground for controlling the value of the bias voltage. In an alternative arrangement, a negative one volt power supply could be substituted for the six volt supply, resistor 36, capacitor 39 and diode 40.

A positive bias for the trigger transistor 22 may be provided from a source 44 through a resistor 45 to the junction point 46 of the capacitor 32 and inductor 33. A diode 47 may be connected between the junction point 46 and circuit ground for clamping the bias voltage to a low level so that a minimum amount of energy is required to turn on the trigger transistor. With appropriately selected component values, this bias voltage could be omitted. Means may be provided for resetting the binary to a desired state via a reset terminal 49 and resistor 50 connected to the junction point 46.

A diode 54 is connected between the collector of transistor 55 and the junction point 34. The portion 14 of the input steering circuit is identical to the portion 13.

The circuit illustrated herein utilizes pnp transistors with negative supply voltages to the collectors and positive biases to the bases, with the circuit being actuated by negative going input signals. Of course, npn transistors may be utilized with appropriate polarity changes.

In discussing the operation of the circuit, assume that initially the multivibrator transistor 55 is off and multivibrator transistor 56 is on. Both trigger transistors are normally off. With the transistor 55 off, a negative voltage appears at its collector and provides a back bias on the diode 54 resulting in a high impedance in the parallel path through the diode around the trigger transistor 22. At the same time, multivibrator transistor 56 is conducting with substantially zero voltage at its collector so that there is no back bias on diode 60 resulting in a low impedance path in parallel with the trigger transistor 61.

The parallel impedance path in series with the capacitor 31 has a high value for a negative going voltage change at the input terminal 30 due to the reverse biased diodes 54, 38. Therefore there is a maximum transfer of energy from the input terminal through the capacitor 31 to the base of the trigger transistor 22. After the trigger transistor starts to conduct the back bias on the diode 54 disappears, the diode becomes a low impedance resulting in a voltage pulse at the junction 34, with the capacitor 31 charging relatively rapidly.

The transistor 22 is switched on providing an input pulse through line 15 to the multivibrator transistor 56 to cause a change of state in the multivibrator in the conventional manner. No corresponding transfer of energy occurs in the other half of the input steering circuit because of the low impedance parallel path through the diode 60, with the capacitor 63 charging relatively rapidly. Normally a small noise voltage pulse does appear at the junction point 62 as indicated in the drawing. The input steering circuit functions to transfer the energy of the input voltage change to only one trigger and substantially blocks transfer to the other trigger, providing improved selectivity, particularly at higher operating frequencies.

The input steering circuit is operated by the negative going edge of an input signal and is entirely independent of the duration of the input pulse. This is an important advantage in the operation of the binary at lower rates. The driving signal to the trigger transistor is directly coupled through capacitors and inductors and does not have to pass through any diodes thereby substantially reducing the signal loss normally encountered in steering circuits. The inductor 33 connected in series with the capacitors 31, 32 is not necessary to the operation of the input steering circuit. The inductor introduces a delay in signal transmission between the junction point 34 and the transistor base providing additional time for charging of the input capacitor 31. This permits handling of a wider variation in the fall time of the input voltage change. Where the waveform of the input signal is known or closely controlled, the inductor may be omitted. The circuit may be operated with the coupling capacitor 32 omitted when higher pulse rate inputs are not encountered. The particular circuit illustrated herein will operate satisfactorily with sine wave input signals of thirty megacycles and higher frequency. With input signals of a frequency of less than thirty megacycles per second, a waveform standardizing circuit is normally used to provide a steeper wave front than is obtained with a sine wave.

For a specific example, the components of the input steering circuit may have the following values: all transistors, pnp Type 2N961; diodes 38, 47, 54, Type S555G; capacitor 31, 10 picofarads; capacitor 32, 75 picofarads; inductor 33, 1 microhenry; resistor 37, 1,000 ohms; resistor 45, 27,000 ohms. With this circuit, a maximum input rate for proper circuit function was found to be 130 million pulses per second with no lower frequency limit observed for an input with amplitude between 4 and 6 volts and a negative going rate of change equal to or less than 1.6 nanoseconds per volt. The output at terminal 17 or 18 was equal to one half the input rate for all values of input up to the maximum.

In another circuit with all transistors, npn Type 2N709; diodes 38, 47, 54, Type S555G; capacitor 31, 5 picofarads; capacitor 32, 75 picofarads; inductor 33, .22 microhenry; resistor 37, omitted; resistor 45, omitted; a maximum input rate of 230 million pulses per second was observed with an input between 3 and 6 volts and a positive going rate of change equal to or less than 1.4 nanoseconds per volt.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a binary circuit having a bistable multivibrator circuit and a trigger circuit for coupling input pulses to the multivibrator circuit, a new and improved input steering circuit including in combination:

an input terminal;

a first path from said input terminal to the base of the first trigger circuit transistor and including serially connected capacitors joined at a first junction point;

a second path from said input terminal to the base of the second trigger circuit transistor and including serially connected capacitors joined at a second junction point;

means for producing a bias at said first transistor base of a polarity to bias such transistor off;

means for producing a bias at said second transistor base of a polarity to bias such transistor off;

means for producing a bias at said first junction point of a polarity opposite to the associated base bias;

means for producing a bias at said second junction point of a polarity opposite to the associated base bias;

first and second diodes;

means for connecting said first diode between said first junction point and the collector of one multivibrator circuit transistor; and means for connecting said second diode between said second junction point and the collector of the other multivibrator circuit transistor, whereby nonconduction of a multivibrator transistor produces a back bias on the associated diode.

2. In a binary circuit having a bistable multivibrator circuit and a trigger circuit for coupling input pulses to the multivibrator circuit, a new and improved input steering circuit including in combination:

an input terminal;

a first path from said input terminal to the base of the first trigger circuit transistor and including serially connected capacitors joined at a first junction point and an inductor serially connected between said capacitors and said base;

a second path from said input terminal to the base of the first trigger circuit transistor and including serially connected capacitors joined at a second junction point and an inductor serially connected between said capacitors and said base;

means for producing a bias at said first transistor base of a polarity to bias such transistor off;

means for producing a bias at said second transistor base of a polarity to bias such transistor off;

means for producing a bias at said first junction point of a polarity opposite to the associated base bias;

means for producting a bias at said second junction junction point of a polarity opposite to the associated base bias;
first and second diodes;
means for connecting said first diode between said first junction point and the collector of one multivibrator circuit transistor; and
means for connecting said second diode between said second junction point and the collector of the other multivibrator circuit transistor, whereby nonconduction of a multivibrator transistor produces a back bias on the associated diode.

3. In a binary circuit having a bistable multivibrator circuit and a trigger circuit for coupling input pulses to the multivibrator circuit, a new and improved input steering circuit including in combination:
a first capacitor for transferring an input voltage change to a first junction point;
a second capacitor for transferring an input voltage change to a second junction point;
first means for coupling said first junction point to the trigger circuit for one side of the multivibrator circuit;
second means for coupling said second junction point to the trigger circuit for the other side of the multivibrator circuit;
a first diode connected in parallel with said first coupling means and associated trigger circuit between said first junction point and one output of the multivibrator circuit; and
a second diode connected in parallel with said second coupling means and associated trigger circuit between said second junction point and the other output of the multivibrator circuit;
with one of said diodes presenting a low impedance path to its junction point and the other of said diodes presenting a high impedance path to its junction point and with the arrangement of said high and low impedance paths switching as said multivibrator circuit switches.

4. In a binary circuit having a bistable multivibrator circuit and a trigger circuit for coupling input pulses to the multivibrator circuit, a new and improved input steering circuit including in combination:
a first capacitor for transferring an input voltage change to a first junction point;
a second capacitor for transferring an input voltage change to a second junction point;
first means for coupling said first junction point to the trigger circuit for one side of the multivibrator circuit and including a series inductance;
second means for coupling said second junction point to the trigger circuit for the other side of the multivibrator circuit and including a series inductance;
a first diode connected in parallel with said first coupling means and associated trigger circuit; and
a second diode connected in parallel with said second coupling means and associated trigger circuit;
with one of said diodes presenting a low impedance path to its junction point and the other of said diodes presenting a high impedance path to its junction point and with the arrangement of said high and low impedance paths switching as said multivibrator circuit switches.

5. In a binary circuit having a bistable multivibrator circuit and a trigger circuit for coupling input pulses to the multivibrator circuit, a new and improved input steering circuit including in combination:
an input terminal;
a first circuit from said input terminal to one side of the trigger circuit and including a first capacitor, a second capacitor and a first inductor connected in series;
a second circuit from said input terminal to the other side of the trigger circuit and including a third capacitor, a fourth capacitor and a second inductor connected in series;
a first voltage source connected to the junction of said first and second capacitors and to the junction of said third and fourth capacitors;
a second voltage source of the opposite polarity and connected to the junction of said second capacitor and first inductor and to the junction of said fourth capacitor and second inductor;
a first diode connected between the junction of said first and second capacitors and the output of one side of the multivibrator circuit; and
a second diode connected between the junction of said third and fourth capacitors and the output of the other side of the multivibrator circuit.

References Cited by the Examiner

UNITED STATES PATENTS

| | | | |
|---|---|---|---|
| 3,069,565 | 12/1962 | Van Ness | 307—88.5 |
| 3,070,709 | 12/1962 | Slobodzinski | 307—88.5 |
| 3,143,669 | 8/1964 | Gavern et al. | 307—88.5 |
| 3,167,662 | 1/1965 | Crain | 307—88.5 |
| 3,171,039 | 2/1965 | Lorenz | 307—88.5 |

ARTHUR GAUSS, *Primary Examiner.*

J. J. JORDAN, *Assistant Examiner.*